United States Patent [19]
Nohira et al.

[11] 3,817,221
[45] June 18, 1974

[54] DEVICE FOR DISPOSAL OF LIQUID OF CONDENSATION IN EXHAUST GASES

[75] Inventors: Hidetaka Nohira; Kazuo Tomita, both of Susono, Japan

[73] Assignee: Toyota Jidosha Kogyo Kabushiki Kaisha, Toyota-shi, Aichi-ken, Japan

[22] Filed: Apr. 17, 1972

[21] Appl. No.: 244,552

[30] Foreign Application Priority Data
Oct. 1, 1971   Japan.............................. 46-90041

[52] U.S. Cl............................ 123/25 R, 123/119 A
[51] Int. Cl............................................. F02m 25/02
[58] Field of Search......... 123/25 R, 119 A; 60/278, 60/309

[56] References Cited
UNITED STATES PATENTS
| | | | |
|---|---|---|---|
| 1,419,239 | 6/1922 | DuBrie | 123/25 B |
| 1,961,444 | 6/1934 | Lewis | 123/119 A X |
| 2,461,580 | 2/1949 | Wiczer et al | 60/309 X |

*Primary Examiner*—Charles J. Myhre
*Assistant Examiner*—R. H. Lazarus
*Attorney, Agent, or Firm*—Stevens, Davis, Miller & Mosher

[57] ABSTRACT

This invention relates to a device for disposal of liquid of condensation in exhaust gases of an internal combustion engine prior to recirculation of a portion of the exhaust gases to the engine.

Said device comprises at least one trap mounted at a suitable position in an exhaust gas passageway for liquid for catching liquid formed by condensation of moisture in exhaust gases, and piping connecting said trap to a suction system of the internal combustion engine.

Said liquid is recirculated to a combustion chamber by the negative pressure of air drawn by suction into the combustion chamber.

2 Claims, 3 Drawing Figures

DEVICE FOR DISPOSAL OF LIQUID OF CONDENSATION IN EXHAUST GASES

This invention relates to a device for disposal of liquid of condensation in exhaust gases which is adapted to be used with an exhaust gas recirculation device for an internal combustion engine or similar device to cause the liquid of condensation in exhaust gases to be recirculated to the combustion chamber without permitting the same to stay in the exhaust gas passageway.

Nowadays, an exhaust gas recirculation device or similar device is generally mounted in many types of internal combustion engines as an attachment for controlling exhaust emissions. Exhaust gases of internal combustion engines have a very high moisture content, the ratio of water vapor to fuel being 1:1 to 1.2 by weight. Such water vapor has hitherto been vented to atmosphere through the exhaust pipe.

The liquid of condensation in exhaust gases causes a lot of trouble. It is highly acidic such as a carbonic acid and sulfuric acid, so that it tends to cause corrosion of the exhaust pipe, muffler and other parts of the exhaust system. Component parts of the exhaust gas recirculation device developed as means for reducing noxious elements in exhaust emissions also tend to suffer corrosion due to the high acidity of the liquid of condensation in exhaust gases, thereby causing malfunction and misoperation of the affected parts to occur.

An object of this invention is to provide a device for disposal of liquid of condensation in exhaust gases of an internal combustion engine which permits to preclude corrosion of various component parts of the exhaust gas recirculation device attached to the internal combustion engine which might otherwise be caused by the highly acidic liquid of condensation in exhaust gases and staying in such parts, and which permits noxious elements in exhaust emissions to be removed in the same manner as by injection of water into the combustion chamber.

Another object of the invention is to provide a device for disposal of liquid of condensation in exhaust gases of an internal combustion engine which accomplishes the end by utilizing the suction pressure of the internal combustion engine so that the aforementioned trouble can be obviated.

Additional and other objects as well as features and advantages of the invention will become evident from the description set forth hereinafter when considered in conjunction with the accompanying drawing, in which.

Figure 1:
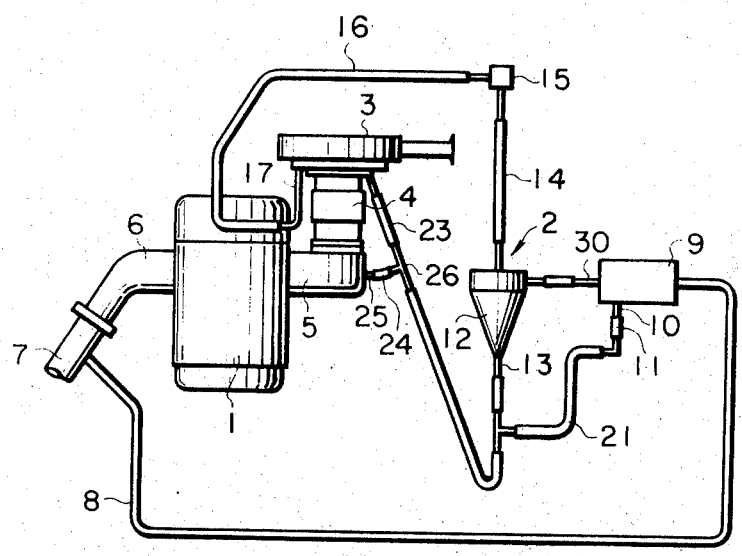
FIG. 1 is a schematic side view of an internal combustion engine embodying this invention.
Figure 2:
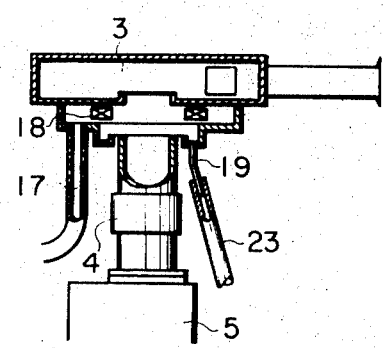
FIG. 2 is a side view of the air cleaner and carburetter section with certain parts being shown in section.
Figure 3:
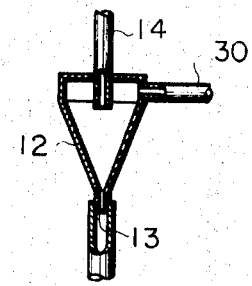
FIG. 3 is a side view of the dust removing means with certain parts being shown in section.

The drawings illustrate the device according to this invention as incorporated in an exhaust gas recirculation device 2 mounted in an internal combustion engine 1 as an attachment. As shown in FIG. 1, exhaust gases are supplied in part from an exhaust system comprising an exhaust manifold 6 and an exhaust pipe 7 to a suction system comprising an air cleaner 3, a carburetter 4 and an air suction manifold 5 through an exhaust gas recirculation passageway 8.

Recirculation passageway 8 branches off from exhaust pipe 7 and is connected to exhaust gas cooling means 9 where water vapor is condensed into liquid which passes through a pipe 10 to a first trap 11.

The exhaust gases discharged from exhaust gas cooling means 9 are introduced through a pipe 30 into dust removing means 12 where water vapor therein is further condensed into liquid which flows into a second trap 13.

The exhaust gases which have been subjected to dusting are introduced through a pipe 14 and control means 15 into an exhaust passageway 16, thence into air cleaner 3 through a recirculated exhaust gas inlet port 17 disposed on the downstream side of air cleaner 3. The exhaust gases have minute particles removed therefrom by a filter 18 before being drawn by suction into carburetter 4. When passing through filter 18, the exhaust gases undergo adiabatic expansion and are cooled, so that the water vapor therein is condensed into liquid and enters a third trap 19.

Liquid take-out ports each formed at the bottom on one of the traps 11, 13 and 19 are connected together by pipes 21, 22 and 23, and connected through a branch pipe 26 and a pipe 24 to a suction port 25 of suction manifold 5 where liquid is subjected to the action of negative pressure of air drawn by suction into the suction manifold.

If internal combustion engine 1 is operated and exhaust gases flow into recirculation device 2, the liquid formed at various parts by condensation of water vapor in exhaust gases will flow into traps 11, 13 and 19 and be drawn by suction into suction manifold 5 by the action of the negative pressure of air drawn by suction thereinto. The liquid will thus be drawn into the combustion chamber together with the air-fuel mixture to be consumed therein. The device according to this invention can thus keep the highly acidic liquid from staying in the exhaust gas passageway.

As aforementioned, the device according to the invention causes liquid of condensation in exhaust gases to flow into the traps and then permits the liquid to be drawn by suction into the combustion chamber and treated. The invention can prevent corrosion of various parts of the exhaust gas recirculation device which might otherwise be caused by the liquid of high acidity staying therein. Besides, the liquid drawn by suction into the combustion chamber behaves in the same manner as the water injected into the combustion chamber, so that the temperature of combustion gases can be lowered and the production of noxious elements in exhaust emissions can be prevented.

What is claimed is:

1. Apparatus comprising an internal combustion engine having an inlet system including a suction means and an exhaust pipe for exhaust gases, wherein the improvement comprises an exhaust gas recirculation system connected to said inlet system, an air cleaner disposed in said exhaust gas recirculation system, said exhaust gas recirculation system including a trap for catching condensate liquid removed from the recirculating exhaust gas prior to passage to said intake system, said trap being located at an outlet of said air cleaner, and piping connecting said trap to said suction means of the internal combustion engine to recirculate the liquid condensate to a combustion chamber by the negative pressure of air drawn by suction into said combustion chamber.

2. Apparatus comprising an internal combustion engine having an inlet system including a suction means and an exhaust pipe for exhaust gases, wherein the improvement comprises an exhaust gas recirculation system connected to said exhaust pipe to recirculate a portion of the exhaust gases to said inlet system, an air cleaner disposed in said exhaust gas recirculation system, said exhaust gas recirculation system including means constituting a part of said exhaust gas recirculation system for cooling, removing dust from, and filtering said recirculating exhaust gases, a trap connected to each of said cooling, dust removing and filtering means and means to recirculate liquid from said traps to said inlet system.

* * * * *